United States Patent
Schoerghofer et al.

(10) Patent No.: US 11,498,815 B2
(45) Date of Patent: Nov. 15, 2022

(54) CRANE CONTROL

(71) Applicant: EPSILON Kran GmbH., Salzburg (AT)

(72) Inventors: Simon Schoerghofer, Puch bei Hallein (AT); Johannes Steindl, Elsbethen (AT)

(73) Assignee: EPSILON Kran GmbH, Salzburg (AT)

( * ) Notice: Subject to any disclaimer, the term of this patent is extended or adjusted under 35 U.S.C. 154(b) by 631 days.

(21) Appl. No.: 16/509,719

(22) Filed: Jul. 12, 2019

(65) Prior Publication Data
US 2020/0017336 A1 Jan. 16, 2020

(30) Foreign Application Priority Data
Jul. 13, 2018 (EP) .................................... 18183441

(51) Int. Cl.
*B66C 13/56* (2006.01)
*B66C 23/42* (2006.01)
*B60P 1/54* (2006.01)

(52) U.S. Cl.
CPC .............. *B66C 13/56* (2013.01); *B66C 23/42* (2013.01); *B60P 1/5423* (2013.01); *B66C 2700/0371* (2013.01)

(58) Field of Classification Search
CPC . B66C 13/56; B66C 23/42; B66C 2700/0371; B66C 13/46; B66C 23/36;
(Continued)

(56) References Cited

U.S. PATENT DOCUMENTS 6,148,946 A 11/2000 Takahasi et al.
6,267,195 B1 7/2001 Takahasi et al.
(Continued)

FOREIGN PATENT DOCUMENTS

DE 102012015776 A1 * 2/2014 ............. B60K 35/00
DE 102016012786 A1 * 4/2018 ............. B66C 13/16
(Continued)

OTHER PUBLICATIONS

Kojima, Construction Machinery, Oct. 31, 2000, EPO, JP 2000303498 A, Machine Translation of Description (Year: 2000).*
(Continued)

*Primary Examiner* — James A English
*Assistant Examiner* — Matthew D Lee
(74) *Attorney, Agent, or Firm* — Wenderoth, Lind & Ponack, LLP (57) ABSTRACT

A crane control for a crane includes at least one operating unit operable by an operator for controlling working functions of the crane. Control signals can be input to actuators of the crane by the operating unit, and a mounting arrangement is provided for mounting the operating unit in a driving cab of the vehicle and a support arrangement connects the operating unit to the mounting arrangement. The support arrangement for the operating unit is supported limitedly moveably between at least two positions, a first position of which is in the form of a working position in which the operating unit is between a steering arrangement of the vehicle and a driving seat, and a second position of which is in the form of a storage position in which the operating unit is moved away from the steering arrangement of the vehicle.

13 Claims, 8 Drawing Sheets

(58) Field of Classification Search
CPC ............ B66C 2700/0357; E02F 9/2004; B60P 1/5423
See application file for complete search history.

(56) References Cited

U.S. PATENT DOCUMENTS

| | | | |
|---|---|---|---|
| 7,506,918 | B2 | 3/2009 | Magni |
| 8,039,769 | B2 | 10/2011 | Asp et al. |
| 9,592,758 | B2 | 3/2017 | Mahler et al. |
| 10,414,635 | B2 | 9/2019 | Hayashi |
| 2004/0154427 | A1* | 8/2004 | Jo ............................ G05G 1/62 74/525 |
| 2004/0261300 | A1* | 12/2004 | McClelland .......... E02F 9/2004 37/348 |
| 2007/0241583 | A1 | 10/2007 | Magni |
| 2008/0066988 | A1 | 3/2008 | Asp et al. |
| 2014/0060216 | A1* | 3/2014 | Smith ...................... G09B 9/04 73/865.6 |
| 2015/0360593 | A1 | 12/2015 | Mahler et al. |
| 2018/0282131 | A1* | 10/2018 | Hayashi ................ G06T 19/006 |

FOREIGN PATENT DOCUMENTS

| | | | | |
|---|---|---|---|---|
| EP | 1 845 056 | | 10/2007 | |
| EP | 2 946 968 | | 11/2015 | |
| EP | 3 363 763 | | 8/2018 | |
| FI | 127421 | | 5/2018 | |
| FR | 2 816 727 | | 5/2002 | |
| GB | 2351796 A | * | 1/2001 | ............ E02F 9/166 |
| JP | 58-30849 | | 2/1983 | |
| JP | 60-53859 | | 4/1985 | |
| JP | 05-42300 | | 6/1993 | |
| JP | 08027839 A | * | 1/1996 | ............ E02F 9/2004 |
| JP | 08128075 A | * | 5/1996 | ............ E02F 9/2004 |
| JP | 09302726 A | * | 11/1997 | ............ E02F 9/2004 |
| JP | 10046629 A | * | 2/1998 | ............ E02F 9/2004 |
| JP | 10121521 A | * | 5/1998 | ............ E02F 9/2004 |
| JP | 10204923 A | * | 8/1998 | ............ E02F 9/2004 |
| JP | 10-280481 | | 10/1998 | |
| JP | H1136368 A | * | 2/1999 | |
| JP | 2000303498 A | * | 10/2000 | ............ E02F 9/2004 |
| JP | 3655429 | | 6/2005 | |
| JP | 3839364 B2 | * | 11/2006 | |
| JP | 2014-170 | | 1/2014 | |
| JP | 2015-59022 | | 3/2015 | |
| JP | 2015226094 A | * | 12/2015 | |
| JP | 2016-199388 | | 12/2016 | |
| JP | 2017-75001 | | 4/2017 | |
| KR | 10-0658803 | | 12/2006 | |
| KR | 10-2010-0002236 | | 1/2010 | |
| RU | 2 137 625 | | 9/1999 | |
| WO | 2009/010818 | | 1/2009 | |
| WO | WO-2009010818 A2 | * | 1/2009 | ............... B60N 2/24 |
| WO | WO-2009050746 A2 | * | 4/2009 | ............... B60N 2/14 |
| WO | 2017/164781 | | 9/2017 | |
| WO | WO-2019146824 A1 | * | 8/2019 | |

OTHER PUBLICATIONS

Erfinder, Driving And Operating Cabin Interior For MotorCar I.e. Load MotorCar . . . , Feb. 13, 2014, EPO, DE 102012015776 A1, Machine Translation of Description (Year: 2014).*

Search Report dated Jan. 11, 2019 in European Patent Application No. 18183441, with English translation.

* cited by examiner

CRANE CONTROL

BACKGROUND OF THE INVENTION

The invention concerns a crane control and a crane comprising such a crane control.

Crane controls of the general kind set forth, with an operating unit which is operable by an operator and which is adapted to control working functions of the crane, are known in the state of the art. Control signals can be input to actuators of the crane by such an operating unit, in which case a mounting arrangement is provided for mounting the operating unit in a driving cab of the vehicle and a support arrangement for the operating unit is provided for supporting the operating unit, with the support arrangement connecting the operating unit to the mounting arrangement. An operating unit known in the state of the art can be supported, for example, at an armrest which is mounted at a passenger seat disposed in a driving cab of a vehicle.

The operator of the crane is usually also the person who steers the vehicle on which the crane is mounted and by which the crane is driven to the location of use. To operate the crane, being effected by way of the operating unit, in the case of operating units known in the state of the art and disposed in the driving cab, the operator has to move within the cab to the operating unit, for example by moving from a driving seat to the passenger seat at which a stationarily mounted operating unit is disposed. As a result, manoeuvring movements of the vehicle and operation of the crane, possibly including actuation of support members, presuppose corresponding changes in position on the part of the operator within the cab. That involves an increased amount of time and a low level of comfort.

SUMMARY OF THE INVENTION

The object of the invention is to provide a crane control of the general kind set forth and a crane equipped with such a crane control, with which the above-discussed problems are avoided.

According to the invention, the support arrangement for the operating unit is supported limitedly moveably between at least two positions, of which one position is in the form of a working position in which the operating unit is between a steering arrangement of the vehicle and a driving seat, and of which another position is in the form of a storage position in which the operating unit is moved away from the steering arrangement of the vehicle. In that way, the operator of the crane can implement operation of the crane without having to leave the driving seat. In other words, in that way, steering of the vehicle and operation of the crane can be effected from the driving seat. By virtue of eliminating a change in position of the operator within the driving cab, the amount of time necessary for changing between steering of the vehicle and operation of the crane can be reduced. In addition, operation of the crane is made more comfortable as a result.

The operating unit for stowage thereof can be moved from the working position into the storage position where it is arranged, for example, while the vehicle is being steered. The operating unit can be moved from the storage position into the working position for operation of the crane.

In that respect, a visualization unit for visualization of a working environment of the crane can be provided. The visualization unit can permit an operator a view into a region of the working environment of the crane, that cannot be seen directly from the driving cab.

In that respect, it can be advantageous if the visualization unit is in the form of a mobile unit so that it is moveable independently of the operating unit and is preferably wearable on the body by an operator. The visualization unit can be a virtual reality display device which can be arranged in front of the eyes of the user. A user can be displayed images of cameras arranged for example on the crane by the visualization unit. A display can be implemented stereoscopically at least for portions of the working environment.

It can be advantageous if the support arrangement is arranged pivotably relative to the mounting arrangement and/or displaceably on the mounting arrangement. That can permit a guided movement between the mounting arrangement and the support arrangement. The support arrangement can be arranged limitedly pivotably relative to the mounting arrangement and/or limitedly displaceably on the mounting arrangement.

In that respect, it can be advantageous if the support arrangement has at least two parts which are pivotable relative to each other, and of which the first part supports the operating unit and the mounting arrangement is arranged on the second part. The limited movement of the operating unit between the working position and the storage position is effected by a pivotal movement of the two parts which are pivotable relative to each other. In that way, at least two parts which are pivotable relative to each other can be disposed between the operating unit and the mounting arrangement.

In that respect, it can be further advantageous if the support arrangement has at least two parts which are displaceable relative to each other, and of which the first part supports the operating unit and the mounting arrangement is arranged on the second part, where the limited movement of the operating unit between the working position and the storage position is effected by a preferably linear displacement of the two parts which are displaceable relative to each other. In that way, at least two parts which are displaceable relative to each other can be disposed between the operating unit and the mounting arrangement.

It is possible to provide a combination of a pivotal movement and a displacement of the two parts of the support arrangement, that are moveable relative to each other.

It can be advantageous if the support arrangement has an adjustment device for adaptation of a position of the operating unit in the working position relative to an operator. The adjustment arrangement can permit further pivotal movement and/or displacement, possibly independently of the at least two parts of the support arrangement, that are moveable relative to each other.

As was mentioned in the opening part of this specification, protection is also claimed for a vehicle comprising a crane and a crane control as described hereinbefore. In that respect, the mounting arrangement of the crane control is mounted in a driving cab of the vehicle.

Preferably, the operating unit in the storage position is arranged beside a driving seat of the vehicle.

The operating unit in the storage position can also be arranged above a driving seat of the vehicle. It is also conceivable for the operating unit to be arranged in the storage position beneath the driving seat.

The operating unit in the storage position can be arranged in front of or behind a driving seat of the vehicle.

BRIEF DESCRIPTION OF THE DRAWINGS

Embodiments of the invention are discussed with reference to the Figures in which.

DETAILED DESCRIPTION OF THE INVENTION

Figure 1:
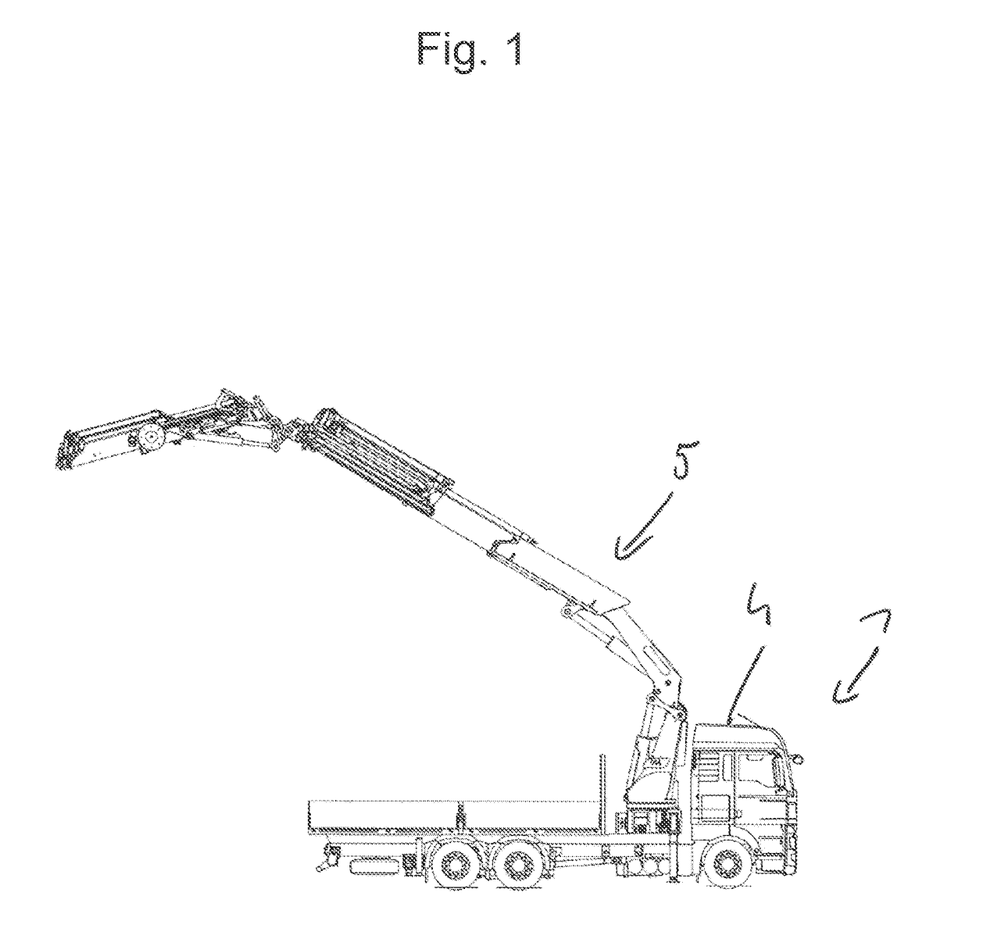
FIG. 1 shows a vehicle with a crane.

FIG. 1 shows a vehicle 1 having a driving cab 4 and a crane in the form of a loading crane arranged on the vehicle 1. An operating unit 2 for controlling working functions of the crane 5 is arranged in the driving cab 4.

Figure 2:
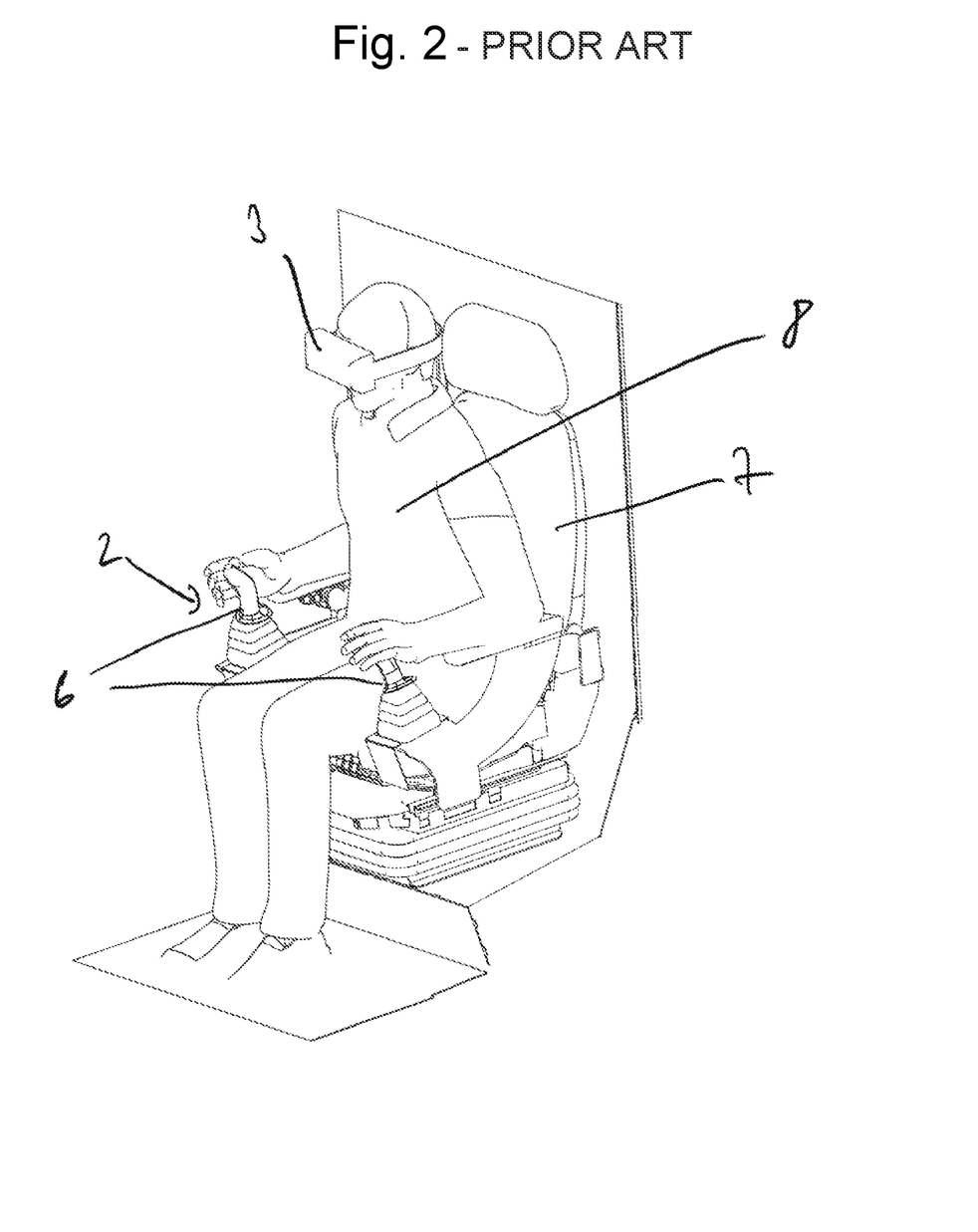
FIG. 2 shows a known operating unit in a driving cab.

FIG. 2 shows an operating unit 2 in the driving cab 4 of the vehicle 1 according to the state of the art. The operating unit 2 is mounted to a passenger seat 7 and includes two operating levers in the form of joysticks 6 mounted on vertically pivotable armrests of the passenger seat 7. As illustrated an operator 8 wears a visualization unit 3 for visualizing a working environment of the crane 5.

Figure 3:
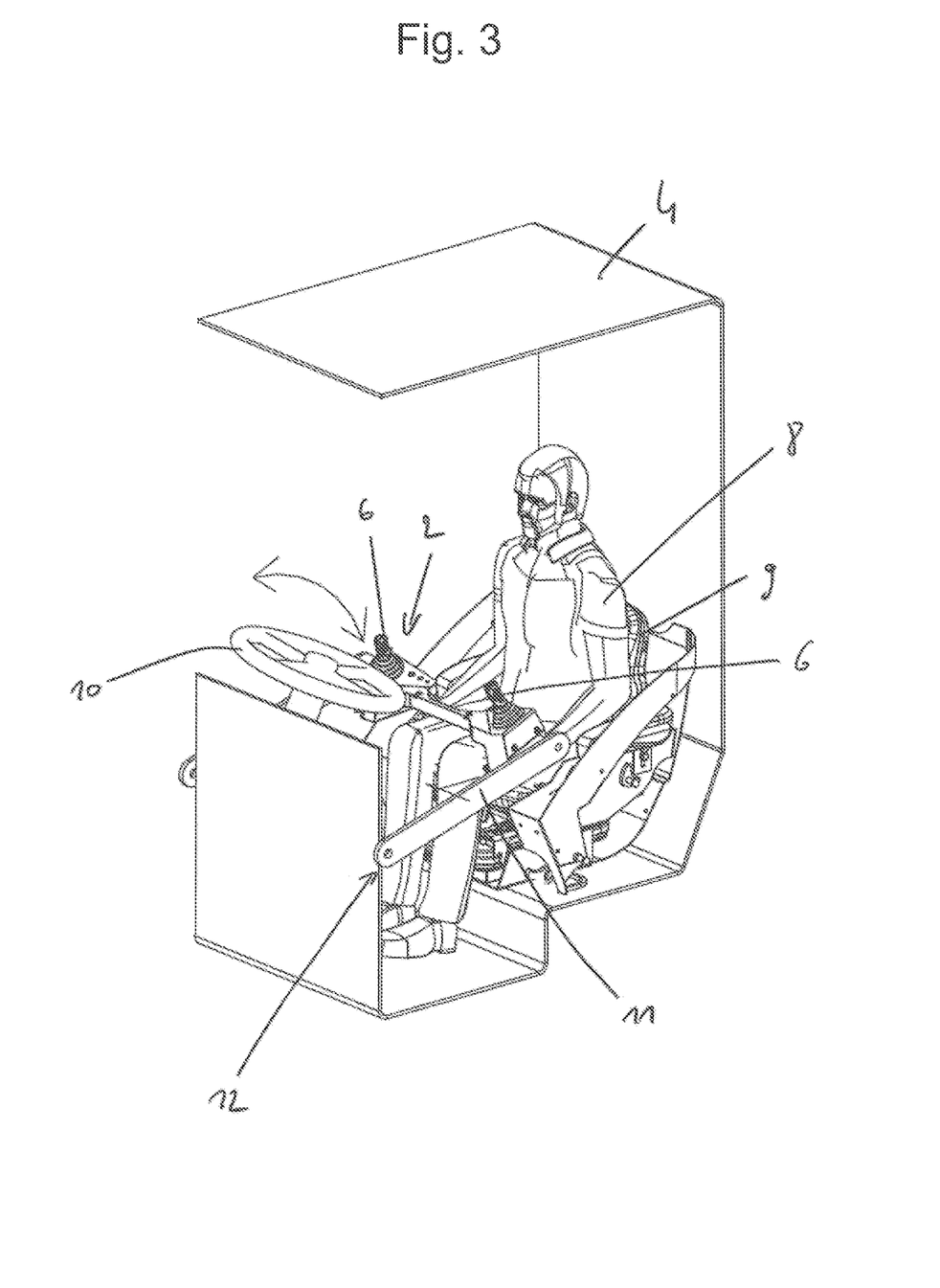
FIG. 3 is a perspective sectional view of a driving cab with a crane control according to the invention.

FIG. 3 shows a perspective sectional view of a driving cab 4 with a crane control according to the invention, including an operating unit 2 which as illustrated is in a working position. In this case then, the operating unit 2 is between a steering arrangement 10 of the vehicle 1 and a driving seat 9. The crane control further includes a support arrangement 11—here in the form of a pivotal lever—for the operating unit 2, which is arranged pivotably relative to a mounting arrangement 12—here in the form of a support pin. The operator 8 shown here, otherwise than as illustrated, can wear a visualization unit 3 for visualization of a working environment of the crane 5, in which case the visualization unit 3 can be a mobile unit (for example virtual reality goggles) so that it is moveable independently of the operating unit 2 (see FIG. 2).

Figure 4:
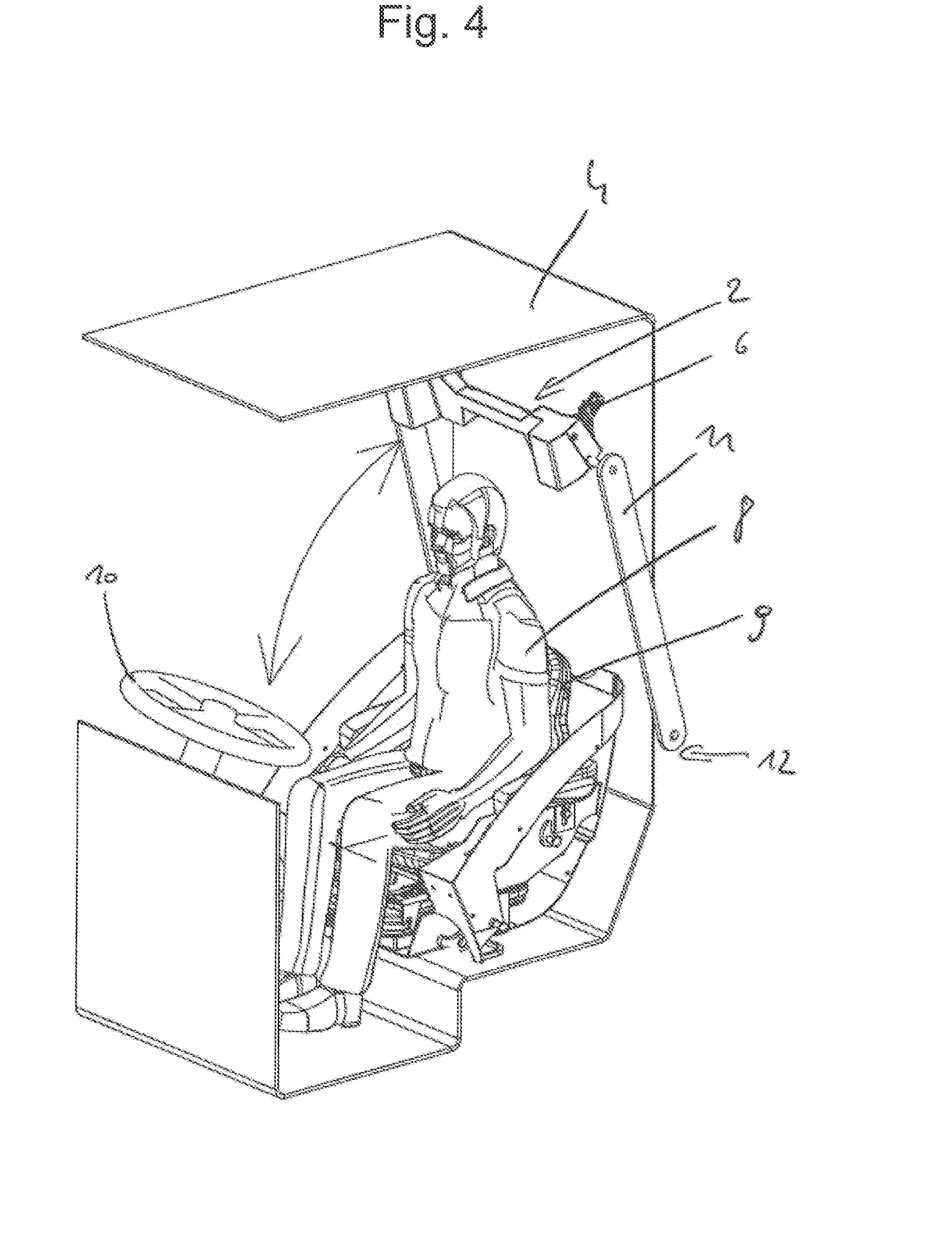
FIG. 4 is a perspective sectional view of a driving cab with a further crane control according to the invention.

FIG. 4 shows a further variant of a crane control. In this example, an operating unit 2 is shown in a storage position in which the operating unit 2 is arranged above a driving seat 9 of the vehicle 1, in which the operating unit 2 is moved away from a steering arrangement 10 of the vehicle 1. By virtue of a pivotal movement of the support arrangement 11, the operating unit 2 can be moved into a working position, in which case then the operating unit 2 is between the steering arrangement 10 of the vehicle 1 and the driving seat 9.

Figure 5:
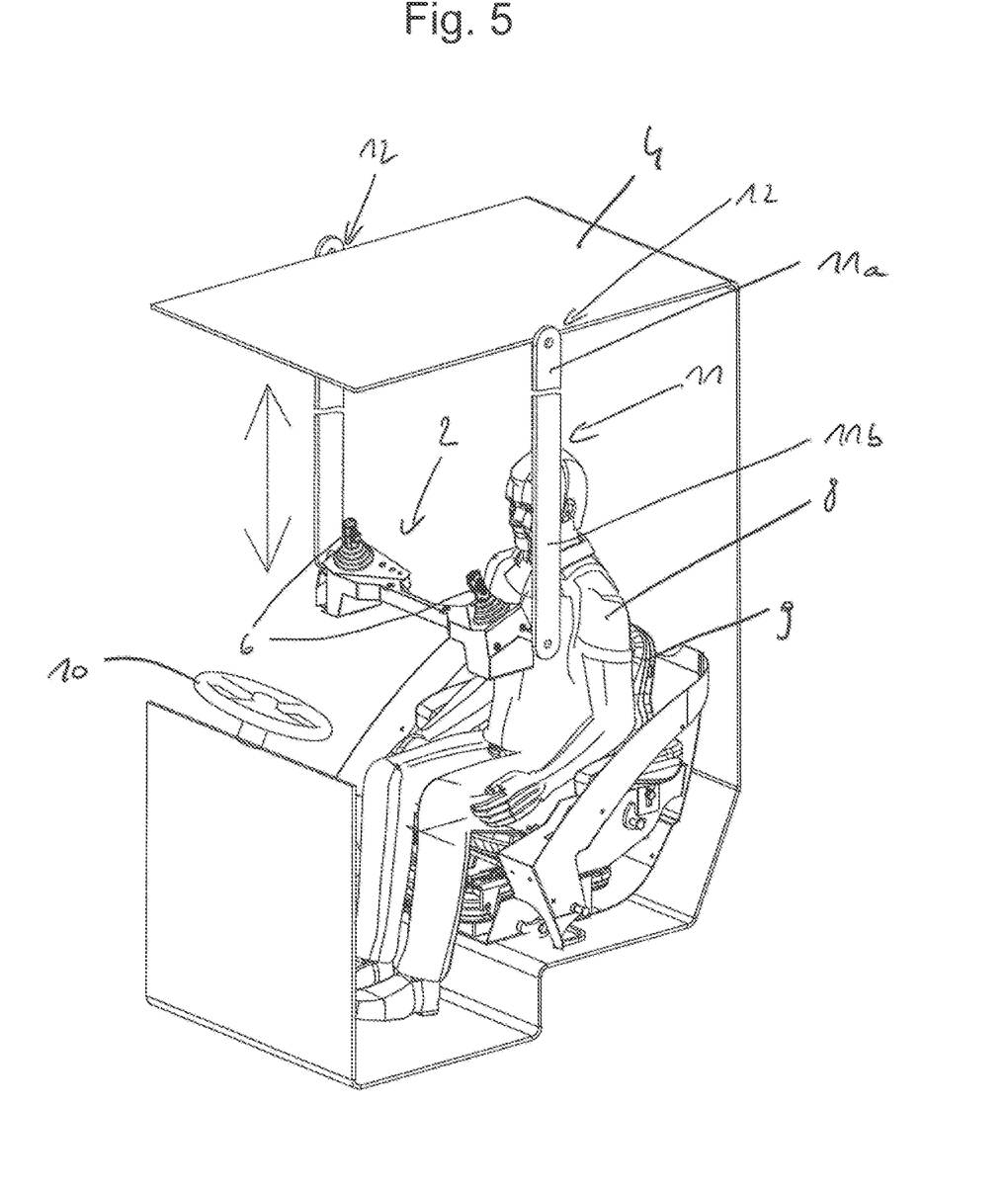
FIG. 5 is a perspective sectional view of a driving cab with a further crane control according to the invention.

FIG. 5 shows a further variant of a crane control. In this example, an operating unit 2 is shown in a position between a storage position and a working position. By virtue of a displacement of the support arrangement 11 which here is provided with two parts 11a, 11b which are telescopic relative to each other, the operating unit 2 can be moved into the working position or the storage position. The support arrangement 11 has two parts 11a, 11b which are displaceable relative to each other and of which the first part 11b supports the operating unit 2, and the mounting arrangement 12—here in the form of a support pin—is arranged on the second part 11a. The limited movement of the operating unit 2 between the working position and the storage position is effected by a preferably linear displacement of the two parts 11a, 11b which are displaceable relative to each other.

Figure 6:
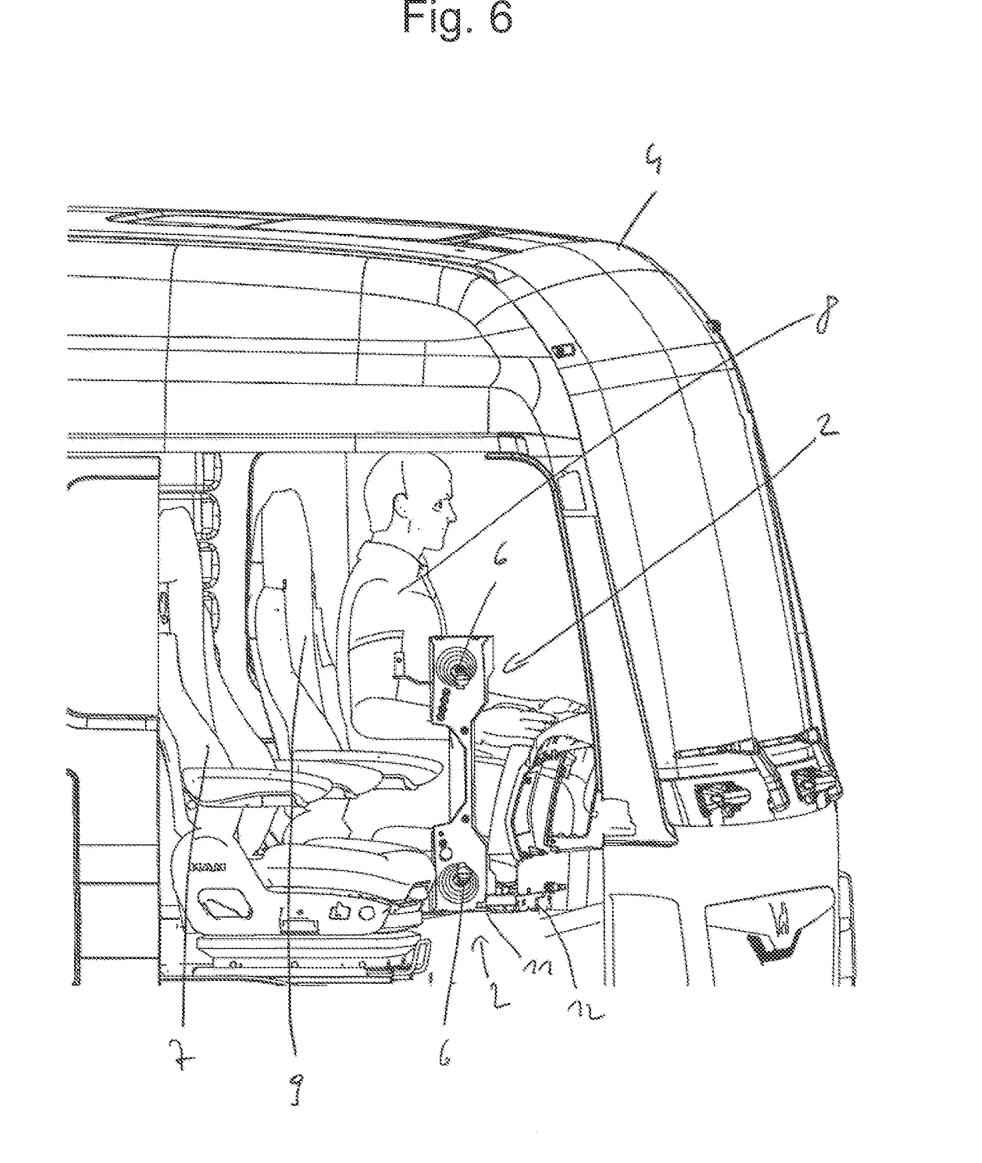
FIG. 6 shows a driving cab with a further crane control according to the invention.

FIG. 6 shows a further variant of a crane control arranged in a driving cab 4 of a vehicle 1. A driving seat 9 and a passenger seat 7 are disposed in the driving cab 4. An operator 8 sits in the driving seat 9. For reasons of clarity, the steering arrangement 10 which would be in front of the operator 8 is not shown here. The Figure shows an operating unit 2 in a storage position in which the operating unit 2 is arranged beside the driving seat 9. The support arrangement 11 and the mounting arrangement 12 can be of the configuration shown in FIGS. 7 and 8.

Figure 7:
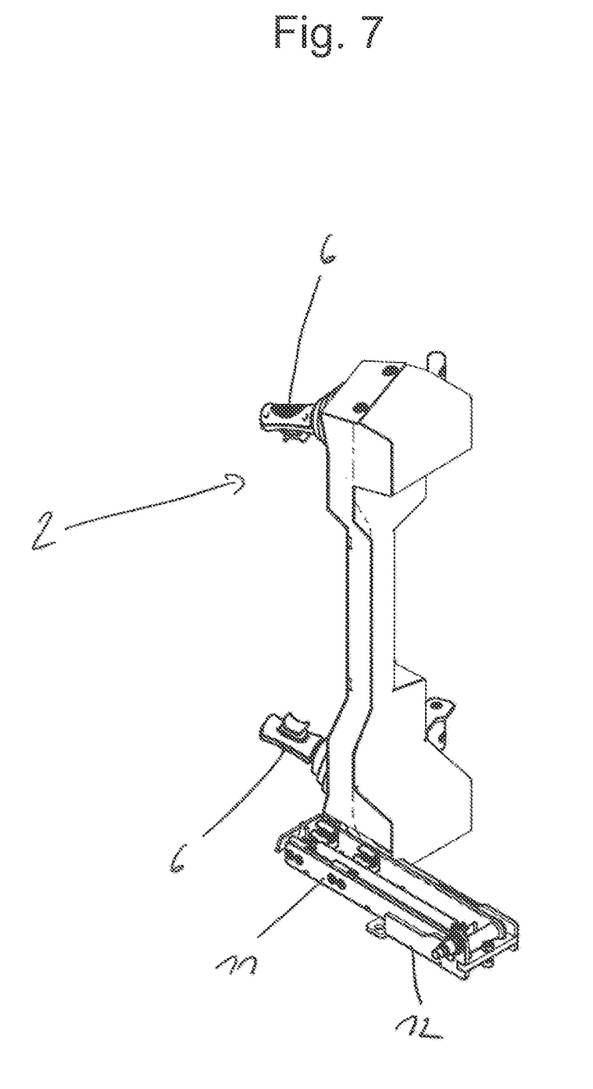
FIG. 7 shows a proposed crane control with an operating unit in the storage position of the support arrangement.

FIG. 7 shows an operating unit 2 supported on a support arrangement 11, wherein the support arrangement 11 is in a storage position in which the operating unit 2 is moved away from a steering arrangement 10 of a vehicle 1 (see FIG. 6). The operating unit 2 can be mounted in a driving cab 4 of the vehicle 1—for example by screwing to the floor of the driving cab 4—by means of a mounting arrangement 12. The support arrangement 11 is arranged on the mounting arrangement 12 pivotably relative to the mounting arrangement 12.

Figure 8:
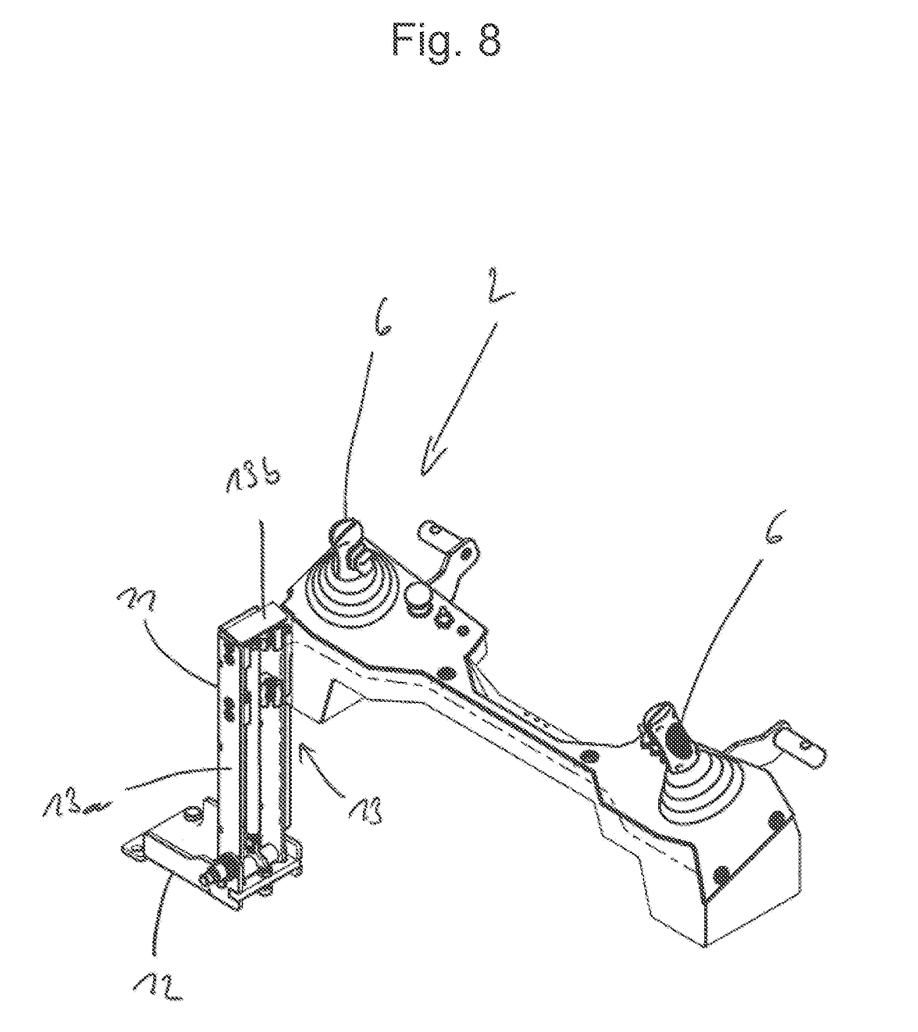
FIG. 8 shows the operating unit of FIG. 7 in a working position of the storage arrangement.

FIG. 8 shows the support arrangement 11 with the operating unit 2 of FIG. 7 mounted thereto, in a working position. The support arrangement 11 has an adjustment device 13 for adaptation of a position of the operating unit 2 in the working position relative to an operator 8. The adjustment device 13 has two parts 13a, 13b which are displaceable relative to each other and of which the first part 13b carries the operating unit 2 and the mounting arrangement 12 is arranged on the second part 13a. As can be seen from a comparison of FIGS. 7 and 8, the support arrangement 11 is pivotably connected to the mounting arrangement 12 to allow the support arrangement 11 and operating unit 2 to pivot relative to the mounting arrangement 12 between the storage position of FIG. 7 and the working position of FIG. 8.

LIST OF REFERENCES 1 vehicle
2 operating unit
3 visualization unit
4 driving cab
5 crane
6 joystick
7 passenger seat
8 operator
9 driving seat
10 steering arrangement
11 support arrangement
11a part of the support arrangement
11b other part of the support arrangement
12 mounting arrangement
13 adjustment device
13a part of the adjustment device
13b other part of the adjustment device

The invention claimed is:

1. A vehicle comprising:
   a crane;
   a driving cab having a steering arrangement, a driving seat, and a passenger seat therein; and a crane control for controlling the crane, the crane control including:
- an operating unit operable by an operator for controlling working functions of the crane, the operating unit being configured to input control signals to actuators of the crane,
- a mounting arrangement for mounting the operating unit in the driving cab, and
- a support arrangement for supporting the operating unit, the support arrangement connecting the operating unit to the mounting arrangement, the support arrangement being moveable between at least two positions including a first position which is a working position in which the operating unit is between the steering arrangement and the driving seat and a second position which is a storage position in which the operating unit is moved away from the steering arrangement wherein the mounting arrangement of the crane control is mounted within the driving cab, and the support arrangement is configured such that the operating unit in the storage position is arranged above the driving seat or between the driving seat and the passenger seat.

2. The vehicle according to claim 1, wherein the crane control further includes a visualization unit for visualization of a working environment of the crane.

3. The vehicle according to claim 2, wherein the visualization unit is a mobile unit moveable independently of the operating unit.

4. The vehicle according to claim 1, wherein the support arrangement is pivotable relative to the mounting arrangement and/or displaceable relative to the mounting arrangement.

5. The vehicle according to claim 4, wherein the support arrangement has a first part and a second part pivotable relative to each other, the first part supporting the operating unit and the second part being connected to the mounting arrangement, wherein movement of the operating unit between the working position and the storage position is effected by a pivotal movement of the first part and the second part relative to each other.

6. The vehicle according to claim 1, wherein the support arrangement has a first part and a second part displaceable relative to each other, the first part supporting the operating unit and the second part being connected to the mounting arrangement, wherein movement of the operating unit between the working position and the storage position is effected by a linear displacement of the first part and the second part relative to each other.

7. The vehicle according to claim 1, wherein the support arrangement has an adjustment device for adjustment of a position of the operating unit in the working position relative to an operator.

8. The vehicle according to claim 1, wherein the operating unit in the storage position is arranged beside the driving seat.

9. The vehicle according to claim 1, wherein the operating unit in the storage position is arranged above the driving seat.

10. The crane control according to claim 3, wherein the visualization unit is wearable on a body of an operator.

11. The vehicle according to claim 1, wherein the operating unit in the storage position is arranged between the driving seat and the passenger seat.

12. The vehicle according to claim 11, wherein the support arrangement is pivotably connected to the mounting arrangement to allow the support arrangement and operating unit to pivot relative to the mounting arrangement between the storage position and the working position.

13. The vehicle according to claim 1, wherein the support arrangement is pivotably connected to the mounting arrangement to allow the support arrangement and operating unit to pivot relative to the mounting arrangement between the storage position and the working position.

* * * * *